D. F. KUSTER & G. J. NIEMANN.
PLOWING MACHINE.
APPLICATION FILED JUNE 6, 1910.
990,659.
Patented Apr. 25, 1911.
2 SHEETS—SHEET 1.
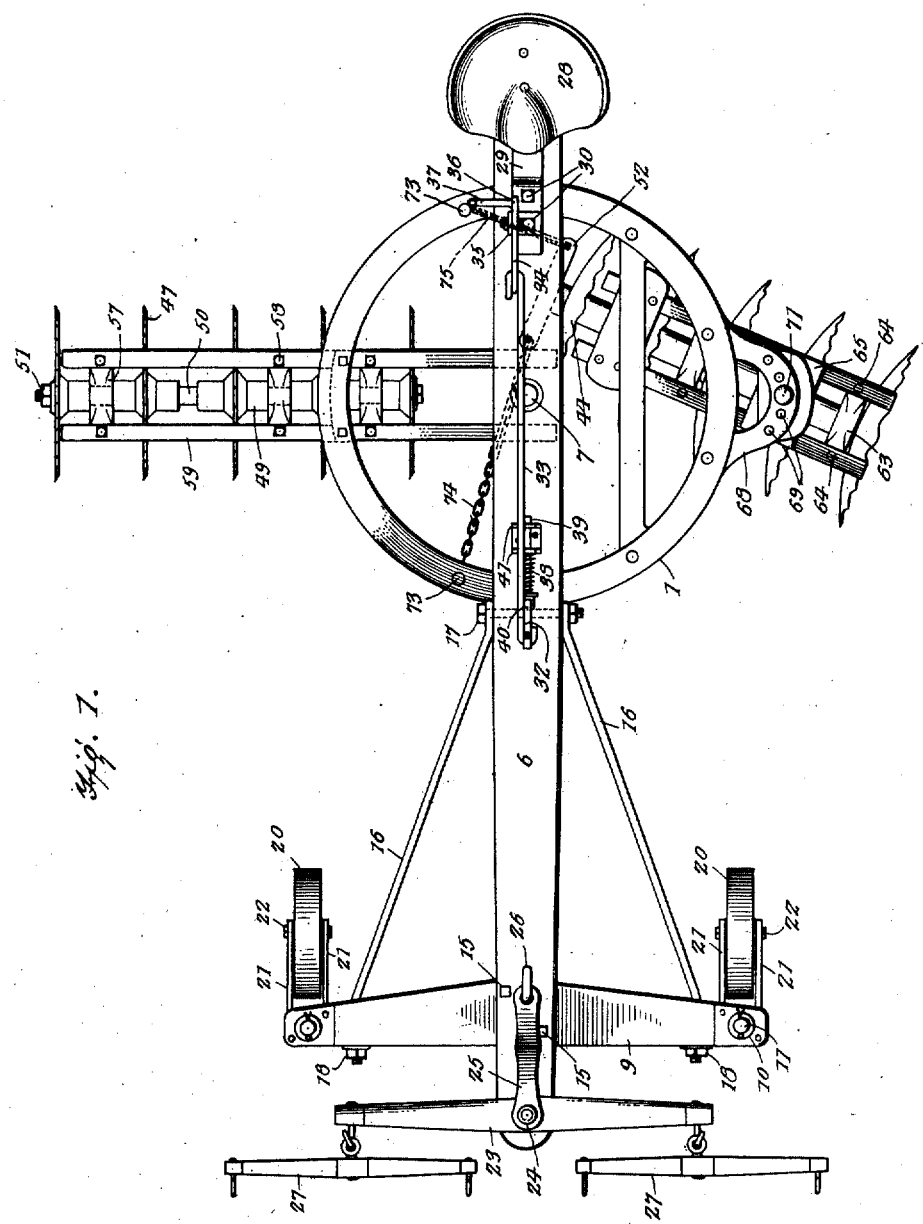
WITNESSES:
L. H. Schmidt
C. E. Travier
INVENTORS,
DANIEL F. KUSTER,
GUSTAV J. NIEMANN,
BY Munn & Co
ATTORNEYS

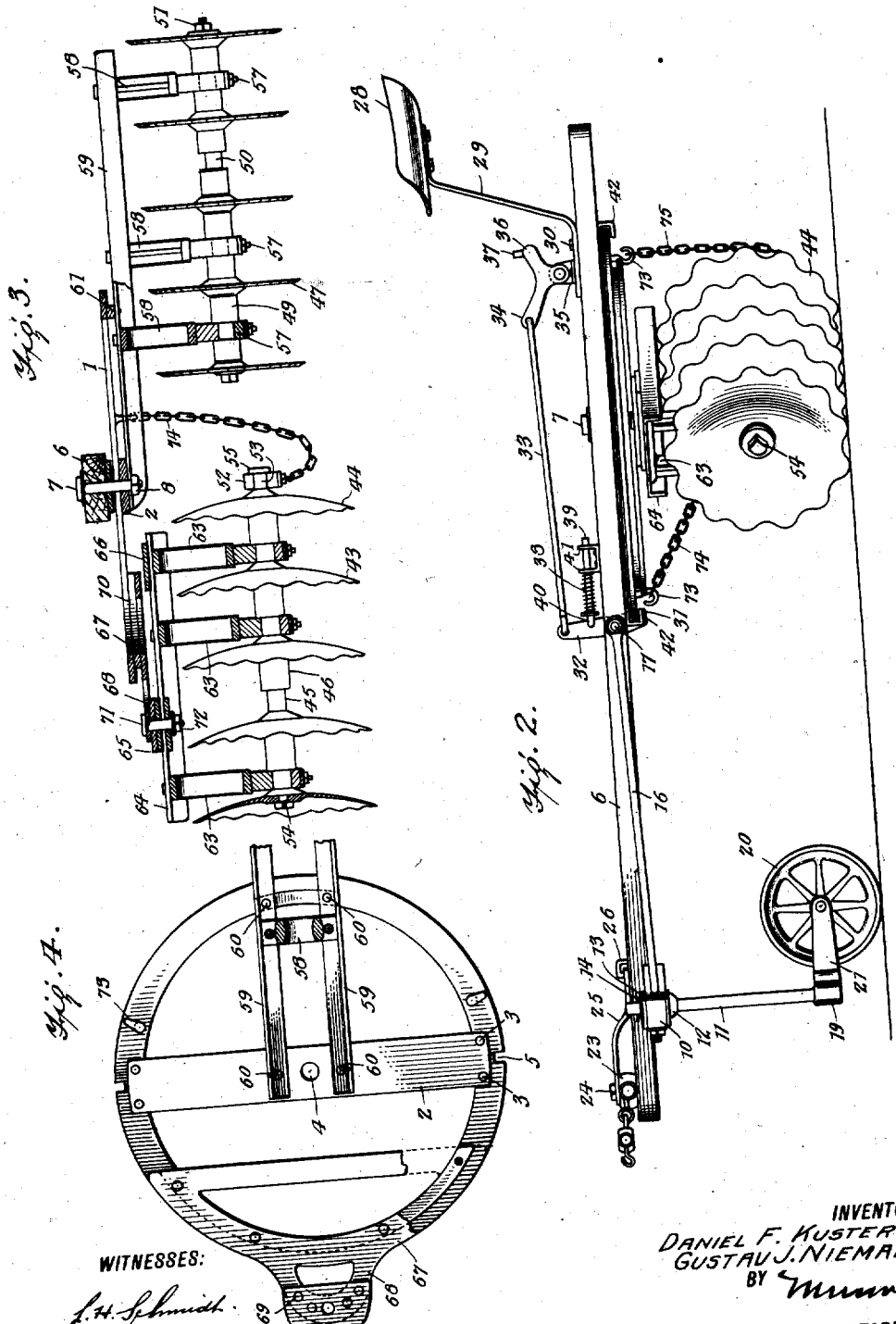

UNITED STATES PATENT OFFICE.

DANIEL F. KUSTER AND GUSTAV J. NIEMANN, OF WASHTUCNA, WASHINGTON.

PLOWING-MACHINE.

990,659.

Specification of Letters Patent. Patented Apr. 25, 1911.

Application filed June 6, 1910. Serial No. 565,168.

*To all whom it may concern:*

Be it known that we, DANIEL F. KUSTER and GUSTAV J. NIEMANN, citizens of the United States, and residents of Washtucna, in the county of Adams and State of Washington, have made certain new and useful Improvements in Plowing-Machines, of which the following is a specification.

My invention is an improvement in plowing machines, and consists in certain novel constructions and combinations of parts, hereinafter described and claimed.

Referring to the drawings forming a part hereof, Figure 1 is a plan view of the improvement, Fig. 2 is a side view, Fig. 3 is a transverse vertical section, and Fig. 4 is a plan view of supporting frame.

The present embodiment of the invention comprises an annular frame 1, provided with a diametrical cross bar 2, which is secured at its ends to the frame by bolts or rivets 3. The cross bar is provided with a central opening 4, and at each end of the cross bar the edge of the frame is notched as at 5.

A tongue 6 is arranged transversely of the frame, and is connected to the cross bar by a king bolt 7, passing through the tongue and the opening 4, and secured in place by a nut 8. At its front end the tongue is provided with a cross bar 9, having at each end a bearing 10, in which is journaled a vertical shaft 11.

The shaft is provided with a fixed collar 12 below the cross bar, and a washer 13 encircles the shaft above the cross bar, and a cotter pin 14 passes through the shaft above the washer, to hold the parts in place. The cross bar is held to the tongue by bolts 15, and is braced by brace rods 16, passing at one end through the cross bar near its ends, and held at the other end by a bolt 17 passing through the tongue and the brace rods. The ends of the rods are threaded beyond the tongue, and are engaged by nuts 18.

A yoke 19 is secured by its body portion to the lower end of each shaft, and a wheel 20 is journaled between the arm 21 of each yoke, on a bolt 22, passing through the arm and the wheels. A double tree 23 is pivoted to the front end of the tongue by a bolt 24, and a clip 25 is pivoted to a staple 26 on the tongue, and is also engaged by the bolt 24 above the double tree.

A swingle tree 27 is pivoted to each end of the double tree, and a seat 28 is supported by a spring plate 29, the plate being connected to the rear end of the tongue by bolts 30. The tongue is rotatable with respect to the frame on the king bolt, and is normally held in the position shown in Fig. 1 by a catch 31, on the lower end of a lever 32, pivoted on the bolt 17 before mentioned.

A link 33 is pivoted to the upper end of the lever, and extends rearwardly to a connection with one arm 34 of an elbow lever pivoted to a bracket 35 on the tongue, and the other arm 36 of the elbow lever is provided with a lateral foot bar 37 in position for engagement by the foot of the operator to rock the lever to release the catch.

The catch is normally held in engagement with one of the notches 5 of the frame, by means of a spring 38 encircling a rod 39, which is pivoted at 40 to the lever above the tongue, and is slidable in bearings 41 on the tongue. The spring acts to force the upper end of the lever forwardly and to hold the catch in engagement with the notch.

The tongue is provided with guides 42 on each side of the frame, in which the edge of the frame moves. A plurality of sets of concave disks are supported by the frame, one set on each side of the tongue, each of the disks 43 of one set having a scalloped or serrated edge 44, and the said disks are journaled on a shaft 45, each disk having a hub 46 through which the shaft passes, the said hub extending from the concave face, and acting to space the disks on the shaft. A cross head 52 is journaled on one end of the shaft.

The cross head 52 is journaled on a reduced portion 53 at one end of the shaft 45, and the other end is threaded and engaged by a nut 54. The outermost disk on the shaft is not provided with an extended hub as shown at the left of Fig. 1, and a head 55 is arranged outside of the reduced portion 53, to hold the cross head in place.

The disks 47 of the other set are flat, and the edge 48 thereof is serrated. Each disk is provided with a hub 49 extending on opposite sides of the disk, and acting as a spacing sleeve, and the disks of the set are journaled on a shaft 50, each of whose ends is threaded, and engaged by a nut 51. The hubs of the outermost disks of the set extend only on one side as shown at the right of Fig. 3.

The shaft 50 is journaled in sectional bearings 57 in the lower ends of loop shaped hangers 58, which are riveted or otherwise secured at their upper ends to spaced parallel angle plates 59, which are riveted or bolted as at 60 to the frame 1, and to the cross bar 2. A spacing block 61 of arc shape is arranged between the bars and the frame.

The shaft 45 is journaled in sectional bearings 62, in similar hangers 63, bolted or riveted at their upper ends to angle plates 64, arranged in spaced parallel relation, and the said bars are connected near their centers by upper and lower cross plates 65, and at their inner end by a cross plate 66.

An arc shaped open frame 67 is riveted to the under face of the frame 1 at one side, and the said frame is provided with a radial extension 68, having an arc shaped series 69 of openings. An arc shaped spacing plate 70 is arranged between the frame 67 and the frame 1, and a bolt 71 passes through one of the openings of the series 69, and through registering openings in the cross bars 65, and is engaged by a nut 72, to pivot the angle plates 64 to the frame 67.

It will be evident from the description, that the angle plates 59, and the angle plates 64, and their respective connections, form a plurality of auxiliary frames, one of which the former is fixed to the main frame, while the latter is pivoted thereto. The first frame extends laterally from the main frame at right angles to the direction of movement thereof, while the last named may be swung into a variety of positions.

The frame 1 is provided on its under face with a plurality of depending hooks 73, and chains 74 and 75 are connected with each end of the cross head 52, and with the adjacent hook, to limit the swinging movement of the pivoted auxiliary frame. The chains may be lengthened or shortened, by engaging different links with the hook.

The pivot of the swinging auxiliary frame, is arranged at one-third the length of the frame from the outer end, so that one-third of the frame is outside of the bolt, and the remaining two-thirds is inside. In turning at the end of the row, the pressure against the concave disks swings the frame into the position shown in Fig. 1, so that the disks travel with their planes parallel with the direction of motion of the frame.

In operation the machine is drawn through the field, and the pressure of the soil against the disks of the swinging frame holds the said frame in inclined position with respect to the tongue, since the greater portion of the pressure is on the inner end of the frame. The disks are then in the best possible position for pulverizing the soil, and are held automatically in this position, but may yield to avoid obstruction.

We claim—

1. A plowing machine, comprising an annular frame, a tongue arranged transversely of the frame and pivoted centrally of the frame, means for locking the tongue to the frame in diametrically opposite positions, a fixed auxiliary frame extending laterally from the frame at one side and at right angles to the tongue, an auxiliary frame pivoted to the main frame intermediate the ends of the said auxiliary frame on the other side of the tongue from the fixed frame, a shaft journaled longitudinally of each of the auxiliary frames, a plurality of disks on each shaft, a cross head on the inner end of the shaft on the pivoted auxiliary frame, and flexible connections between each end of the cross head and the adjacent edge of the annular frame, said connection being of sufficient length to permit the auxiliary frame to swing with respect to the main frame.

2. A plowing machine comprising a frame, a tongue arranged transversely of the frame and pivoted at approximately the center thereof, means for locking the tongue to the frame in opposite positions, a fixed auxiliary frame extending laterally from the main frame at one side, an auxiliary frame pivoted to the opposite side of the main frame intermediate the ends of the said auxiliary frame, disks carried by each of the said auxiliary frames, a flexible connection between the inner end of the pivoted auxiliary frame and the main frame, said connection being of sufficient length to permit a limited swinging movement to the said auxiliary frame.

DANIEL F. KUSTER.
GUSTAV J. NIEMANN.

Witnesses:
J. H. GILL,
H. G. ROE.

Copies of this patent may be obtained for five cents each, by addressing the "Commissioner of Patents, Washington, D. C."